UNITED STATES PATENT OFFICE 1,989,325

AMINE OF HIGH MOLECULAR WEIGHT

Wilhelm Lommel, Leverkusen-Wiesdorf, and Rudolf Schröter, Leverkusen, Germany, assignors to I. G. Farbenindustrie Aktiengesellschaft, Frankfort-on-the-Main, Germany No Drawing. Application April 20, 1932, Serial No. 606,526. In Germany April 23, 1931

7 Claims. (Cl. 260—127)

The present invention relates to amines of high molecular weight, more particularly it relates to compounds of the probable general formula:

wherein R stands for an aliphatic hydrocarbon radical containing at least 12 carbon atoms such as $C_{15}H_{31}$, $C_{17}H_{35}$, $C_{17}H_{29}$ or $C_nH_{2n-1}$, (from naphthenic acids), wherein $n$ means 12–30, $R_1$ means an alkyl, aralkyl, aryl or a hydroaryl radical and $R_2$ stands for hydrogen or an alkyl, aralkyl, aryl or a hydroaryl radical.

The new compounds are obtainable by a method capable of being carried out easily on a commercial scale by converting in the usual manner soap-forming carboxylic acids containing at least 13 carbon atoms in their molecule with or without the addition of other carboxylic acids, such as acetic acid, benzoic acid, phenylacetic acid, hexahydrobenzoic acid or the like into ketones and then converting the ketones into amines by means of ammonia or primary amines containing a replaceable hydrogen attached to nitrogen and in the presence of hydrogen which may be catalytically activated. In this manner, when using ammonia, amines are obtained, which according to the conditions employed consist almost exclusively of primary amines or of mixtures of primary with secondary amines. When the temperature is raised only slightly above the point at which the absorption of hydrogen begins, the formation of primary amines is favored. However, by carrying out the process at a higher temperature secondary amines are formed to a larger extent. The process is particularly valuable in that it enables the use for the purpose indicated of the mixtures of the higher carboxylic acids easily accessible commercially.

Among the mixtures of the higher carboxylic acids easily accessible commercially may be mentioned the mixtures of higher carboxylic acids, obtainable directly or indirectly from fats, oils, waxes, petroleum and other natural products, such as, for example, coconut oil acids, arachis oil acids, resin acids, naphthenic acids occurring in petroleum or obtainable therefrom on working up and also the carboxylic acids which can be produced from paraffin by oxidation. The carbon content of the ketone mixtures, obtained from the aforementioned carboxylic acids, considerably exceeds on an average 10 atoms of carbon. For the production of the ketones or of the mixtures thereof it is advantageous to employ a catalytic process, chemical methods without the use of a catalyst are, however, applicable.

The new amines are generally colorless or nearly colorless oily or solid substances, soluble in organic solvents, such as ether, acetone, benzine, ligroin, benzene and the like, and are generally valuable auxiliary products in the chemical industry and especially in the textile industry.

This invention is illustrated by the following examples but without being limited thereto; the parts are by weight:

*Example 1.*—A mixture of equal parts of the fatty acid of coconut oil, mainly consisting of fatty acids containing 14 and 16 carbon atoms, and glacial acetic acid is passed at 400 to 450° C. over a thoria or manganese catalyst and the higher ketones produced are separated by treatment with dilute caustic soda from acetic acid, acetone and any small quantities of unchanged fatty acid which may be present. 150 parts of the ketone mixture, thus obtained, (boiling at 80 to 185° C. under 12 mms. pressure) are dissolved in 150 parts of methyl alcohol in an autoclave, 4 parts of a nickel catalyst are added, and 15 parts of ammonia are forced in under pressure. The whole is stirred at 75 to 95° C. under a hydrogen pressure of 40 to 50 atmospheres. The hydrogenation is complete after 2½ hours. The product is allowed to cool, separated from the catalyst and distilled in vacuo, the odorless oil obtained boils at 88 to 200° C. under 12 mms. pressure. It is insoluble in water but readily soluble in the customary organic solvents. The product obtained contains a substantial proportion of an amine corresponding to the probable formula:

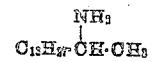

boiling at 135 to 145° C. under 12 mms. pressure. Hydrochloric acid or sulfuric acid form difficultly soluble salts which may serve for the separation of individual fractions. When the higher fractions of the ketone mixture produced without the use of glacial acetic acid are used amines of correspondingly higher boiling points are obtained.

*Example 2.*—100 parts of a ketone mixture boiling at 75 to 103° C. under 12 mms. pressure, obtained from naphthenic acid (see Ullmann, Enzyklopädie der Techn. Chemie, second edition, 1931, vol. 7, page 855) and glacial acetic acid in a manner analogous to that described in Example 1, are placed in an autoclave with 100 parts of methyl alcohol and 4 parts of a nickel-kieselguhr-catalyst, saturated with ammonia under 2 atmospheres pressure and then hydrogenated at 85 to 95° C. under a hydrogen pressure of 30 to 40 atmospheres. The working up follows as in Example 1. The resulting product boils at 70 to 120° C. under 11 mms. pressure. It is a colorless oil and dissolves in dilute hydrochloric acid to quite a clear solution.

Example 3.—100 parts of a ketone mixture obtained from commercial stearine and acetic acid are mixed with 200 parts of a 16.8% solution of ammonia in methyl alcohol, 2% of a nickel catalyst are added and the reaction with hydrogen is effected at 85 to 95° C. under 40 atmospheres pressure with thorough mixing. The hydrogenation is complete in 2 hours. The catalyst is removed by filtration and the methyl alcoholic solution is subjected to distillation. Amines boiling at 187 to 193° C. under 13 mms. pressure are obtained in a yielding exceeding 90%. The amine chiefly obtained corresponds to the formula:

boiling at 187 to 193° C. under 13 mms. pressure.

Example 4.—150 parts of a pentadecylbenzylketone, obtained from palmitic acid and phenyl acetic acid in a manner analogous to that described in Example 1, 100 parts of ethyl alcohol and 2 parts of a nickel catalyst are placed in an autoclave and 10 parts of ammonia are forced in under pressure. The hydrogenation is carried out at a temperature below 100° C. under a hydrogen pressure of 40 atmospheres. 1-phenyl-2-aminoheptadecane is obtained by fractional distillation in vacuo.

Instead of the alcohol specified in the examples other solvents can likewise be employed. However, the use of a solvent is not absolutely necessary. The hydrogen pressure can be varied within wide limits and the customary hydrogenation catalysts can be employed. Instead of ammonia primary amines can be used, for instance, methyl amine, benzylamine, aniline and the like.

Example 5.—50 parts of a ketone mixture obtained from commercial stearic acid and glacial acetic acid in a manner analogous to that described in Example 1, principally consisting of heptadecylmethylketone and 26 parts of n-butylamine are dissolved in 100 parts of methanol. 2% of a nickel catalyst are added and the reaction with hydrogen is effected at 100 to 130° C. under 30 to 50 atmospheres pressure until saturation. The catalyst is separated, the methyl alcohol, the remaining n-butylamine and the reaction water are removed by distillation and the product is fractionated in vacuo. An amine mixture is obtained in a good yield consisting of 2-n-butylamino-nonadecane boiling at 205 to 220° C. under 11 mms. pressure. The colorless oil of unpleasant odor is soluble to a clear solution in diluted acetic acid.

Example 6.—100 parts of a ketone mixture as described in Example 5 are hydrogenated with 100 parts of methanol and 68 parts of aniline with hydrogen and a hydrogenating catalyst such as nickel at 130 to 180° C. under 30 to 50 atmospheres pressure. The mixture is filtered from the catalyst and by fractionating in vacuo an amine mixture is obtained chiefly consisting of 2-phenyl-amino-nonadecane boiling at 200 to 220° C. under 4 mms. pressure. The product coagulates by cooling and is soluble in diluted acetic acid. Instead of methyl alcohol other suitable solvents can be used. The conditions, for example, pressure and temperature may be varied within wide limits.

We claim:
1. Amines having the formula:

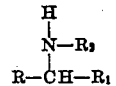

wherein R stands for an aliphatic hydrocarbon radical containing at least 12 carbon atoms, $R_1$ means an alkyl, aralkyl, aryl or a hydroaryl radical and $R_2$ stands for hydrogen or a lower alkyl, benzyl or phenyl radical, and being colorless or nearly colorless oily or solid substances, generally soluble in organic solvents.

2. Amines having the formula:

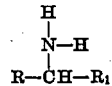

wherein R stands for an aliphatic hydrocarbon radical containing at least 12 carbon atoms and $R^1$ means an alkyl, aralkyl, aryl or a hydroaryl radical, and being colorless or nearly colorless oily or solid substances generally soluble in organic solvents.

3. Amines having the formula:

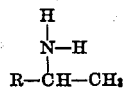

wherein R stands for an aliphatic hydrocarbon radical containing at least 12 carbon atoms, and being colorless or nearly colorless oily or solid substances, generally soluble in organic solvents:

4. Amines having the formula:

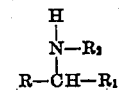

wherein R stands for an alkyl radical containing at least 12 carbon atoms $R_1$ means an alkyl, aralkyl, aryl or a hydroaryl radical and $R_2$ stands for hydrogen or a lower alkyl, benzyl or phenyl radical, and being colorless or nearly colorless oily or solid substances, generally soluble in organic solvents.

5. Amines having the formula:

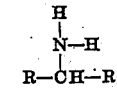

wherein R stands for an alkyl radical containing at least 12 carbon atoms and $R_1$ means an alkyl, aralkyl, aryl or a hydroaryl radical, and being colorless or nearly colorless oily or solid substances, generally soluble in organic solvents.

6. Amines having the formula:

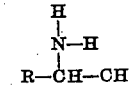

wherein R stands for an alkyl radical containing at least 12 carbon atoms, and being colorless or nearly colorless oily or solid substances, generally soluble in organic solvents.

7. The amine having the formula:

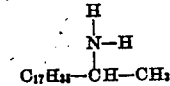

being a colorless oil which boils at 187 to 193° C. under 13 mms. pressure, readily soluble in the customary organic solvents.

WILHELM LOMMEL.
RUDOLF SCHRÖTER.